US009292704B2

(12) United States Patent
Ueno

(10) Patent No.: US 9,292,704 B2
(45) Date of Patent: Mar. 22, 2016

(54) INFORMATION PROCESSING DEVICE FOR DETECTING AN ILLEGAL STORED DOCUMENT, ILLEGAL STORED DOCUMENT DETECTION METHOD AND RECORDING MEDIUM

(71) Applicant: Mitsuyoshi Ueno, Tokyo (JP)

(72) Inventor: Mitsuyoshi Ueno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 167 days.

(21) Appl. No.: 13/796,959

(22) Filed: Mar. 12, 2013

(65) Prior Publication Data

US 2013/0247215 A1    Sep. 19, 2013

(30) Foreign Application Priority Data

Mar. 16, 2012    (JP) ................................. 2012-060868

(51) Int. Cl.
*G06F 21/62*    (2013.01)
*G06F 21/57*    (2013.01)

(52) U.S. Cl.
CPC .......... *G06F 21/6218* (2013.01); *G06F 21/577* (2013.01)

(58) Field of Classification Search
CPC ... G06F 21/62; G06F 21/6218; G06F 21/577; G06F 2221/2113; G06F 2221/2101
USPC .............. 726/1–4, 26–30; 707/781–788, 608; 709/229
See application file for complete search history.

(56) References Cited

U.S. PATENT DOCUMENTS

| 8,473,518 | B1 * | 6/2013 | Yancey et al. ................. 707/786 |
| 2002/0010708 | A1 | 1/2002 | McIntosh | |
| 2002/0052898 | A1 * | 5/2002 | Schilit et al. .................. 707/530 |
| 2002/0138636 | A1 * | 9/2002 | Buttner et al. ................ 709/229 |
| 2006/0080316 | A1 * | 4/2006 | Gilmore ............ G06F 17/30864 |
| 2007/0162320 | A1 * | 7/2007 | Joshi et al. ......................... 705/9 |
| 2007/0204336 | A1 * | 8/2007 | Teijido et al. ................... 726/10 |
| 2008/0016061 | A1 * | 1/2008 | Frieden et al. ..................... 707/6 |
| 2009/0044283 | A1 * | 2/2009 | Yoshihama ..................... 726/28 |
| 2009/0055545 | A1 * | 2/2009 | Saba ............................. 709/229 |
| 2010/0189251 | A1 * | 7/2010 | Curren ........................... 380/28 |
| 2010/0332428 | A1 * | 12/2010 | McHenry et al. ............... 706/12 |
| 2011/0131175 | A1 * | 6/2011 | Kawai .......................... 707/608 |
| 2014/0013433 | A1 * | 1/2014 | Turner ................. G06F 17/241 726/23 |

FOREIGN PATENT DOCUMENTS

| JP | H10289246 A | 10/1998 |
| JP | 2009-098779 A | 5/2005 |
| JP | 2006209649 A | 8/2006 |

(Continued)

*Primary Examiner* — Shanto M Abedin

(57) ABSTRACT

The present invention provides an information processing device which can detect illegal authorization setting efficiently in a short period of time. The information processing device includes a database which stores electronic documents, a means for storing rank values of users of the database, a means for storing the authorization degree of an electronic document or an electronic document group and authorization degrees of respective document classes of the database, a means for analyzing the electronic documents and combining together documents having mutual similarity in a degree equal to or higher than a certain level into a similar document group, and a means for analyzing authorization degrees of respective document classes in the database with reference to the rank values of the users, and thus detecting an electronic document or an electronic document group whose authorization setting is improper.

10 Claims, 14 Drawing Sheets

(56) References Cited

FOREIGN PATENT DOCUMENTS

| | | |
|---|---|---|
| JP | 2006-243819 A | 9/2006 |
| JP | 2007-041881 A | 2/2007 |
| JP | 2009-053813 A | 3/2009 |
| JP | 2012-038126 A | 2/2012 |

* cited by examiner

Fig.13

| USER NAME | RANK VALUE |
|---|---|
| USER3_1 | 4 |

⋮

| USER NAME | RANK VALUE |
|---|---|
| USER3_4 | 4 |
| USER2_1 | 2 |

⋮

| USER NAME | RANK VALUE |
|---|---|
| USER2_10 | 2 |
| USER1_1 | 1 |

⋮

| USER NAME | RANK VALUE |
|---|---|
| USER1_20 | 1 |

Fig.14

| SIMILAR DOCUMENT GROUP NAME | AUTHORIZED USER NAME | AUTHORIZATION DEGREE | RANK-VALUE-SPECIFIC AUTHORIZATION DEGREE |
|---|---|---|---|
| 1 | USER3_1 ~ USER3_4 | 0.04 | 4 → 1.0<br>2 → 0.0<br>1 → 0.0 |
| 2 | USER3_1 ~ USER3_4<br>USER2_1 ~ USER2_10 | 0.23 | 4 → 0.29<br>2 → 0.71<br>1 → 0.0 |
| 3 | USER2_1 ~ USER2_10<br>USER1_1 ~ USER1_10 | 0.58 | 4 → 0.0<br>2 → 0.5<br>1 → 0.5 |
| 4 | USER2_1 ~ USER2_2<br>USER1_1 ~ USER1_4 | 0.19 | 4 → 0.0<br>2 → 0.33<br>1 → 0.77 |

INFORMATION PROCESSING DEVICE FOR DETECTING AN ILLEGAL STORED DOCUMENT, ILLEGAL STORED DOCUMENT DETECTION METHOD AND RECORDING MEDIUM

This application is based upon and claims the benefit of priority from Japanese Patent Application No. 2012-060868, filed on Mar. 16, 2012, the disclosure of which is incorporated herein in its entirety by reference.

1. TECHNICAL FIELD

The present invention relates to an information processing device and illegal stored document detection method for detecting an illegal stored document in an electronic document database, and also relates to a recording medium for recording a program for that purpose.

2. BACKGROUND ART

There is known an information processing device which detects an illegal stored document in an electronic document database. This information processing device automatically selects a highly confidential document from among electronic documents, and confirms whether or not it is stored in a place of low importance.

An example of technology for detecting an illegal stored document is described in Patent Document 1.

A confidential document search system described in Patent Document 1 divides a document into headers, footers and body texts.

Then, on the basis of whether or not a language characteristic to each of the divided parts is contained, the confidential document search system identifies whether the document is confidential information or not. Simultaneously, the confidential document search system identifies what kind of confidential information the document is.

The confidential document search system also determines importance of the document in accordance with the importance of the category of the confidential information.

PATENT DOCUMENT

[Patent Document 1] Japanese Patent Application Laid-Open No. 2006-209649

SUMMARY

An example of an objective of the present invention is to provide an information processing device and illegal stored document detection method, which enables reduction of the calculation amount in illegality detection and setting of access authority depending on a user, and also a recording medium for recording a program for that purpose.

An information processing device according to an exemplary aspect of the invention includes a database which includes a hierarchical structure and stores electronic documents, a user information management unit which stores rank values of users of said database, a class/document information management unit which stores authorization degrees of electronic documents or of electronic document groups, and authorization degrees of respective document classes in said database where the electronic documents or document groups are stored, a document information control unit which analyzes the electronic documents stored in said database and combines together said electronic documents having mutual similarity in a degree equal to or higher than a certain level into a similar document group and a document-class information control unit which analyzes the authorization degrees of respective document classes in said database with reference to said rank values of database users, and thus detects an electronic document or an electronic document group whose authorization setting is improper.

An illegal stored document detection method according to an exemplary aspect of the invention, wherein, a computer analyzes electronic documents stored in a database having a hierarchical structure, records the electronic documents having mutual similarity in a degree equal to or higher than a certain level into a similar document list, classifies the similar document list into similar document groups according to said hierarchical structure of the database, analyzes an authorization degree of each document class in said database by referring to rank values of database users stored in a user information management unit, and stores the result in a class/document information management unit, refers to, at the class/document information management unit, authorization degrees of respective document classes in which similar document groups are stored, and detects an electronic document or an electronic document group whose authorization setting is improper.

A non-volatile recording medium according to an exemplary aspect of the invention storing a program for causing a computer to execute the processing which includes analyzing electronic documents stored in a database having a hierarchical structure, recording the electronic documents having mutual similarity in a degree equal to or higher than a certain level into a similar document list, classifying the similar document list into similar document groups according to said hierarchical structure of the database, analyzing an authorization degree of each document class in said database by referring to rank values of database users stored in a user information management unit, storing the result in a class/document information management unit and referring to, at the class/document information management unit, authorization degrees of respective document classes in which similar document groups are stored and detecting an electronic document or an electronic document group whose authorization setting is improper, and outputting a message of urging a user to check it.

BRIEF DESCRIPTION OF THE DRAWINGS

Exemplary features and advantages of the present invention will become apparent from the following detailed description when taken with the accompanying drawings in which:

FIG. 13 is a diagram showing an example of rank values which a user information management unit stores.

FIG. 14 is a diagram showing an example of information which a class/document information management unit stores.

EXEMPLARY EMBODIMENT

Next, exemplary embodiments of the present invention will be described in detail, with reference to drawings.

First Exemplary Embodiment

Figure 1:
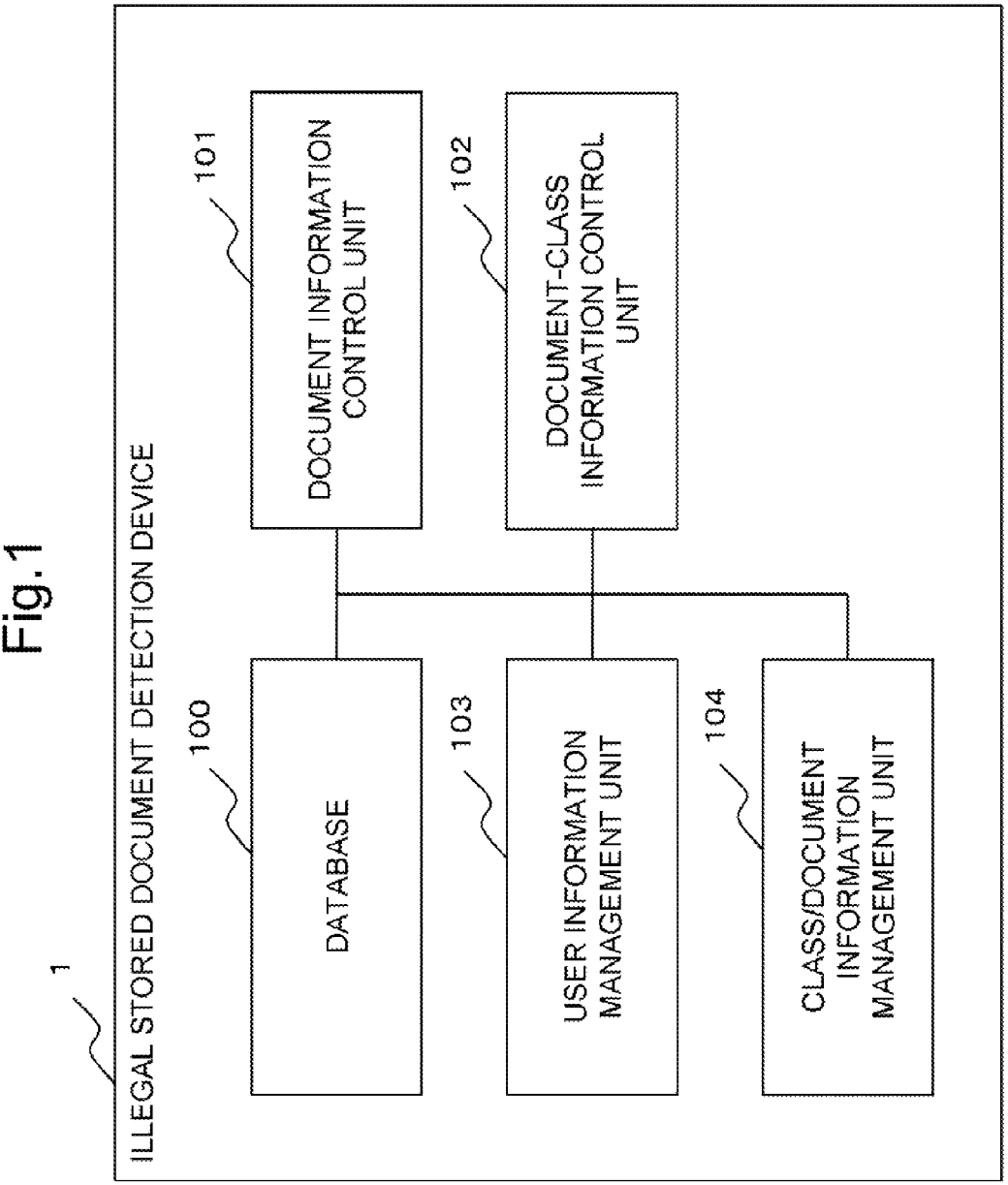
FIG. 1 is a block diagram showing a configuration of an illegal stored document detection device according to a first exemplary embodiment.

FIG. 1 is a block diagram showing a configuration of an illegal stored document detection device (information processing device) 1 capable of detecting an illegal stored document in a first exemplary embodiment. Referring to FIG. 1, the illegal stored document detection device 1 includes a database 100, a document information control unit 101, a document-class information control unit 102, a user information management unit 103 and class/document information management unit 104.

Next, description will be given of a configuration of the illegal stored document detection device 1 capable of detecting an illegal stored document in the first exemplary embodiment.

===Database 100===

The database 100 includes a hierarchical structure. The database 100 stores, as document data, electronic documents distributively allocated to hierarchically structured folders or the like. Here, document-class information representing the hierarchical structure is stored in the class/document information management unit 104. In following description, an electronic document is referred to also as simply a "document". Further, an "electronic document or electronic document group" is referred to also as simply an "electronic document" or a "document".

===Document Information Control Unit 101===

The document information control unit 101 analyzes similarity among the documents (electronic documents) stored in the database 100. Then, the document information control unit 101 combines together the documents having mutual similarity in a degree equal to or higher than a certain degree into a group. Hereafter, the grouped "documents having mutual similarity in a degree equal to or higher than a certain degree" is referred to as a similar document group. Next, the document information control unit 101 stores information about the similar document groups (similar document group information) in the class/document information management unit 104.

Further, with respect to the similar document group information stored in the class/document information management unit 104, the document information control unit 101 detects a common portion among the documents using the document data in the electronic documents stored in the database 100.

Figure 12:
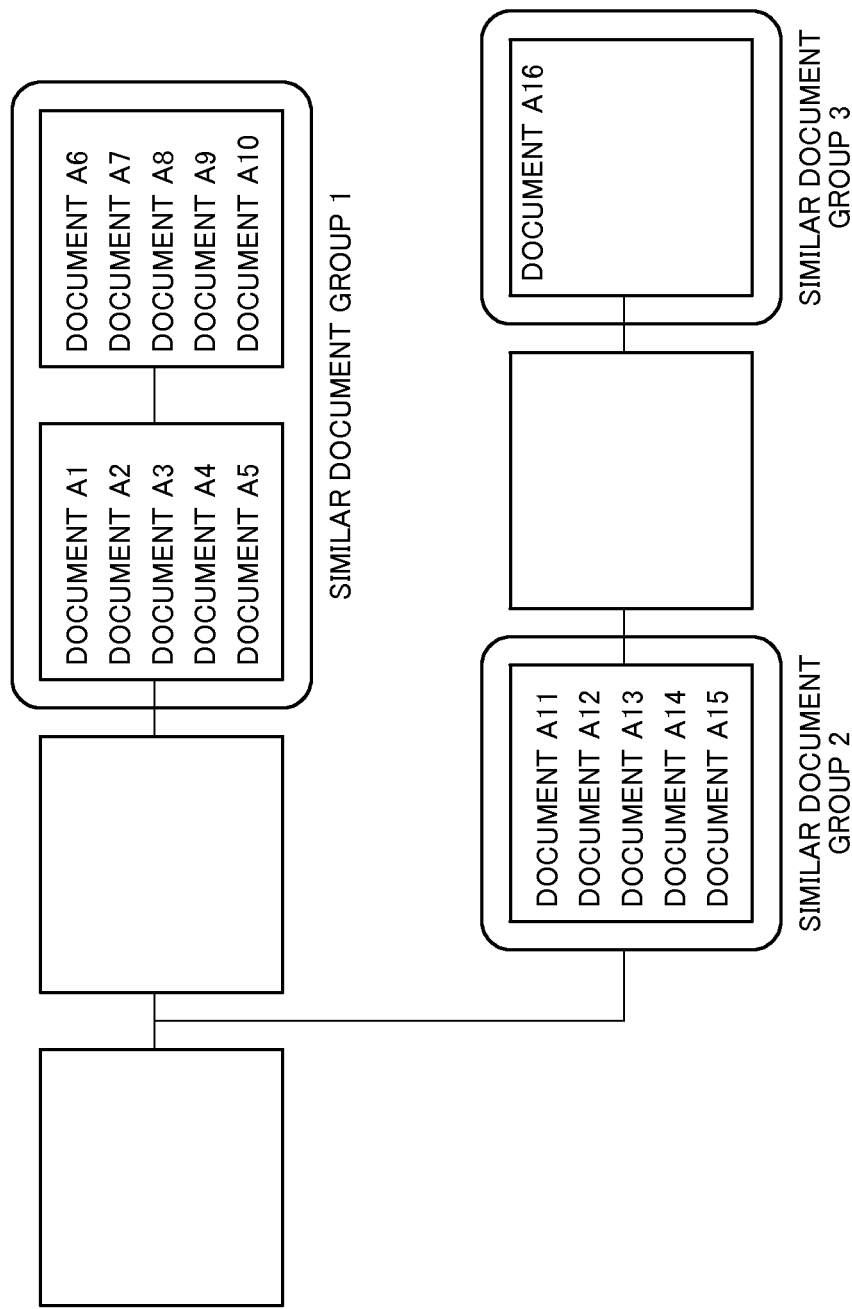
FIG. 12 is a diagram showing an example of a database.

FIG. 12 is a diagram showing an example of the database 100. As shown in FIG. 12, for example, the database 100 includes "documents A1-A16" which are mutually similar documents. FIG. 12 further shows an example where, by the document information control unit 101, documents A1-A10 are grouped into a similar document group "1", documents A11-A15 into "2", and documents A11-A15 into "3".

===Document-Class Information Control Unit 102===

From the document data stored in the database 100 or the similar document group information stored in the class/document information management unit 104, the document-class information control unit 102 calculates an authorization degree for each document class in terms of each similar document group. Then, the document-class information control unit 102 stores the calculated authorization degrees in the class/document information management unit 104.

Further, the document-class information control unit 102 analyzes the authorization degrees of respective document classes of the database 100 stored in the class/document information management unit 104. Then, on the basis of the analysis result, the document-class information control unit 102 detects an electronic document or an electronic document group (similar document group) with improper authorization setting, and outputs a message of urging a user to check it.

The authorization degree is information representing how tightly the electronic document or the electronic document group is protected. The document-class information control unit 102 calculates an authorization degree using, for example, a following formula (1).

$$\text{authorization degree} = \frac{\text{(sum of reciprocal rank values of respective authorized users)}}{\text{(sum of reciprocal rank values of respective ones of all users)}} \quad (1)$$

Here, the users are users of the database 100 (will be referred to also as database users or simply users). The rank value will be described later.

The above-described authorization degree increases with increasing the number of authorized persons (users). The authorization degree includes a tendency to be more difficult to be high with increasing rank value.

Also possible is to calculate an authorization degree for each rank value (rank-value-specific authorization degree). The rank-value-specific authorization degree is calculated by the document-class information control unit 102 using a following formula (2).

$$\text{rank-value-specific authorization degree} = \frac{\text{(total number of authorized users of the specific rank value)}}{\text{(total number of users authorized to access the document class)}} \quad (2)$$

The rank-value-specific authorization degree is a value representing which rank value of users are granted authority to access documents included in the document class. The sum of rank-value-specific authorization degrees over all rank values is 1. That is, a rank-value-specific authorization degree represents the proportion of authorized users of the rank to whole authorized users.

=== User Information Management Unit 103 ===

The user information management unit 103 stores rank values of database users. The rank value is a value according to the authority level for a user, for example, according to the post.

FIG. 13 is a diagram illustrating an example of rank values stored in the user information management unit 103. For example, the rank value is assigned as a positive integer being larger for higher post. Accordingly, the lowest rank value is assumed to be 1. The rank value is stored being related to identification information (user name) for identifying a user. Here, the rank value is not limited to an integer, and may be assigned as a value expressed in percentage.

=== Class/Document Information Management Unit 104 ===

The class/document information management unit 104 stores similar document group information and authorization degrees, as similar group information, for each similar document group. The authorization degrees are authorization degrees of each document class in the database 100 corresponding to the electronic document or the electronic document group analyzed by the document information control unit 101.

FIG. 14 is a diagram showing an example of information stored in the class/document information management unit 104.

Figure 2:
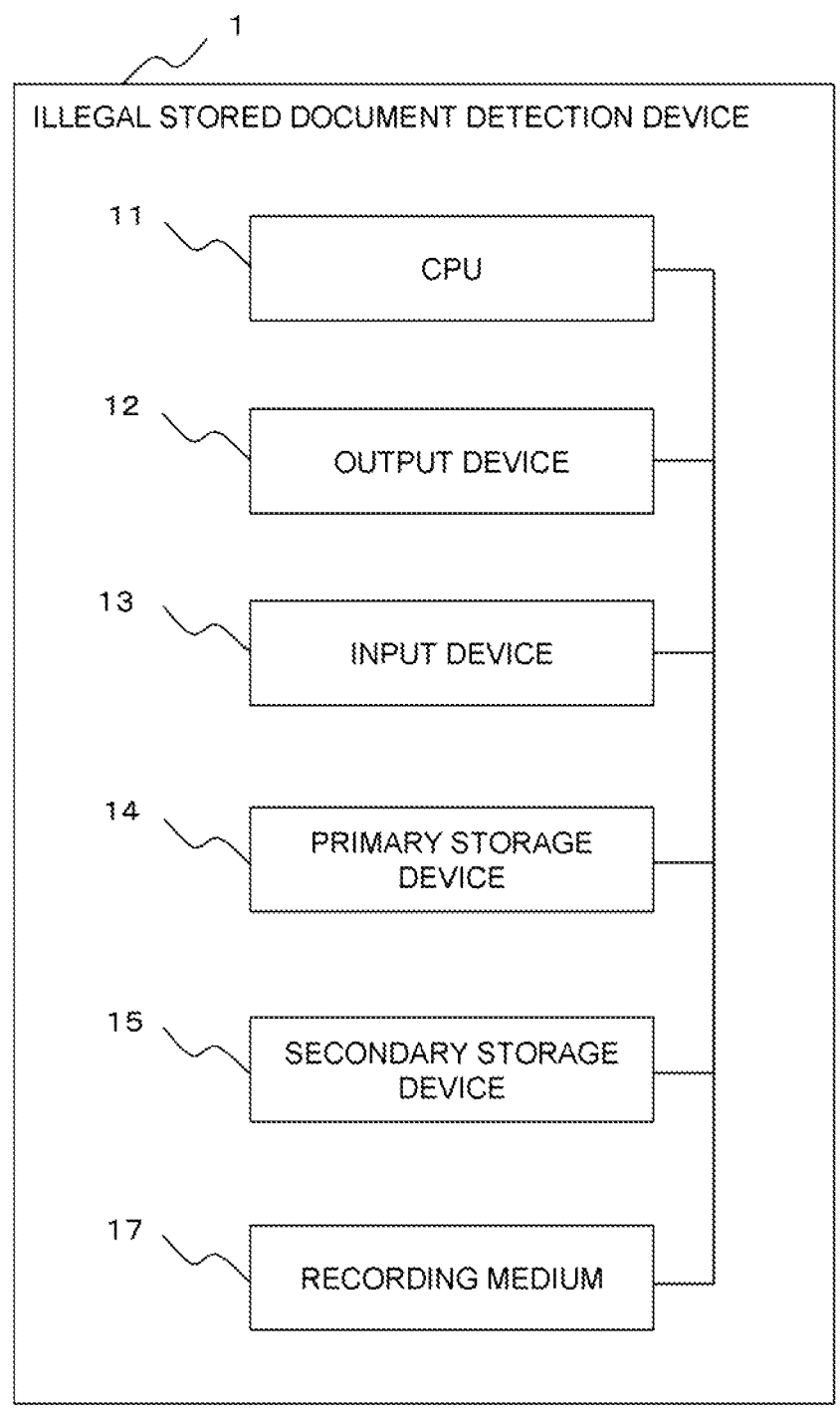
FIG. 2 is a diagram showing a hardware configuration for realizing an illegal stored document detection device capable of detecting an illegal stored document by a computer device and its peripheral devices, in the first exemplary embodiment.

FIG. 2 is a diagram showing a hardware configuration where the illegal stored document detection device 1 in the first exemplary embodiment is realized by a computer and its peripheral devices. As shown in FIG. 2, the illegal stored document detection device 1 includes a CPU (Central Processing Unit) 11, an output device 12, an input device 13, a primary storage device 14 and a secondary storage device 15.

The illegal stored document detection device 1 further includes a recording medium (or a storage medium) 17 supplied from outside. The recording medium 17 may be a non-volatile recording medium for storing information non-temporarily.

Causing an operating system to operate, the CPU 11 controls the whole of the illegal stored document detection device 1 according to the first exemplary embodiment.

For example, the CPU 11 reads a program and data from the secondary storage device 15 into the primary storage device 14, and thus executes various processes as the document information control unit 101 and the document-class information control unit 102 shown in FIG. 1.

The secondary storage device 15 is, for example, an optical disk, a flexible disk, a magneto-optical disk, a hard disk, or a semiconductor memory and the like, and it records a computer program in a computer-readable form. A computer program may be downloaded from an external computer not illustrated in the diagram, which is connected to a communication network also not illustrated. For example, the database 100, the user information management unit 103 and the document information management unit 104, in the first exemplary embodiment, are realized by the secondary storage device 15.

The input device 13 is realized by, for example, a mouse, a keyboard, built-in key buttons and the like, and used for input operation. The input device 13 is not limited to a mouse, a keyboard, built-in key buttons, and may be realized by a touch panel, for example.

The output device 12 is realized by a display, for example, and used for confirming output.

Here, in the block diagram (FIG. 1) used in describing the first exemplary embodiment, the configuration is shown in terms of functional blocks rather than hardware blocks. These functional blocks are realized by the hardware configuration shown in FIG. 2. However, there is no particular restriction on realization means of the respective units included in the illegal stored document detection device 1. That is, the illegal stored document detection device 1 may be realized in the form of a physically combined single device, and may also be realized by physically separated two or more devices which are connected with each other by wire or wireless.

Further, the CPU 11 may read a computer program recorded in the primary storage device 14 and, according to the program, may operate as the document information control unit 101 and the document-class information control unit 102.

Also possible is that the recording medium 17 with codes of the above-described program recorded therein is supplied to the illegal stored document detection device 1. Accordingly, the illegal stored document detection device 1 may read and execute the codes of the program stored in the recording medium 17. That is, the present exemplary embodiment includes an exemplary embodiment of the recording medium 17 which stores software to be executed by the illegal stored document detection device 1 (an illegal stored document detection program) temporarily or non-temporarily.

Next, description will be given of operation of the illegal stored document detection device 1 thus configured, with reference to flow charts in FIGS. 3, 4 and 5.

Figure 3:
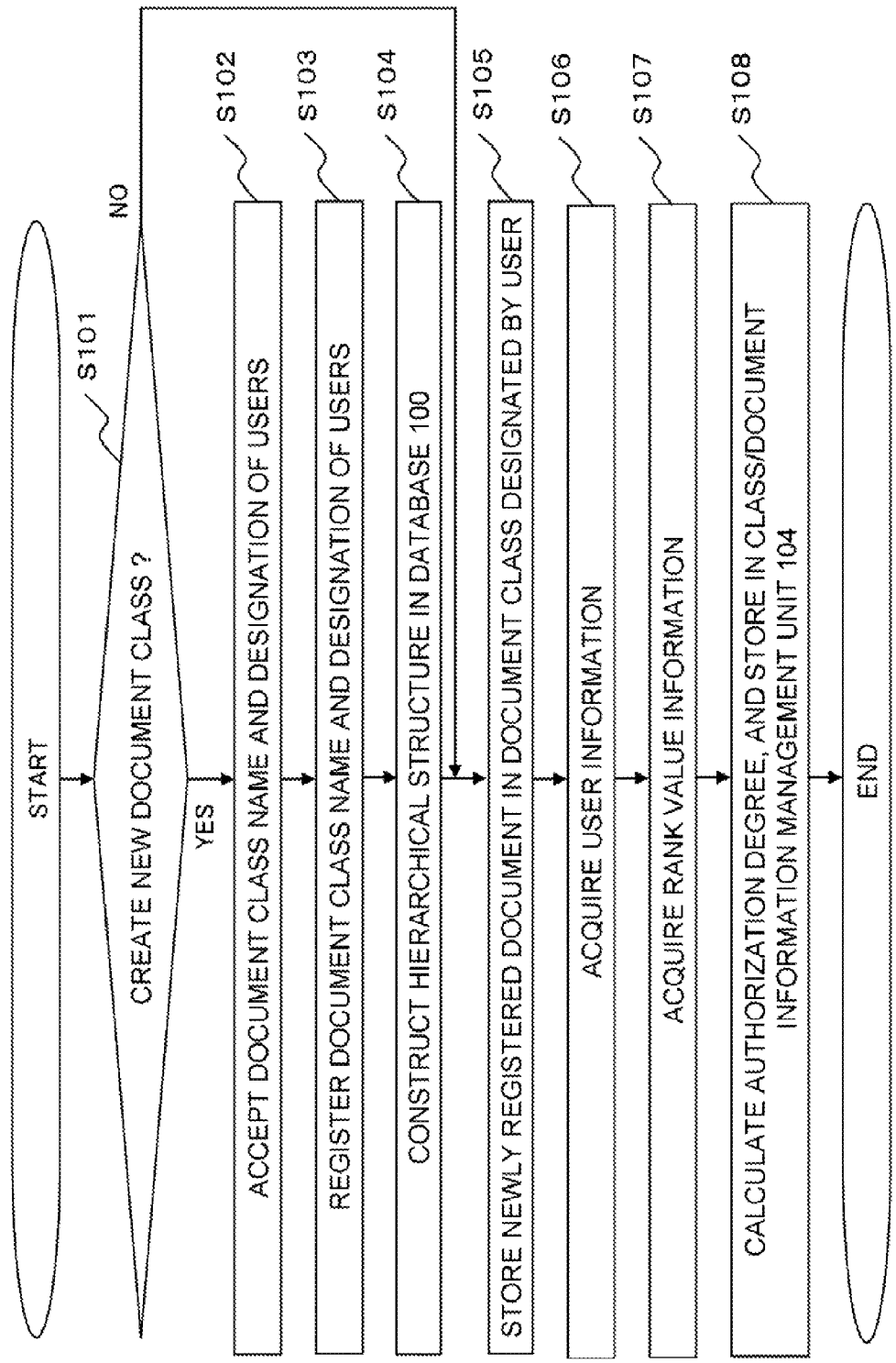
FIG. 3 is a flow chart illustrating operation of electronic document registration by the illegal stored document detection device, in the first exemplary embodiment.

FIG. 3 is a flow chart illustrating operation of electronic document registration in the illegal stored document detection device 1 in the first exemplary embodiment. Here, the process according to this flow chart may be executed under the above-described program control by the CPU 11.

As shown in FIG. 3, in the electronic document registration, the document-class information control unit 102 firstly confirms whether a document class is to be newly created in the database 100, on the basis of a user's designation from the input device 13 (Step S101).

If a new document class is to be created (YES at the Step S101), the document-class information control unit 102 accepts, from the input device 13 operated by the user, the document class name and designation of users to be authorized to refer to documents in the document class (for example, identification information about the users) (Step S102).

Then, the document-class information control unit 102 registers them as document-class information in the class/document information management unit 104 (Step S103).

Next, the document-class information control unit 102 constructs a hierarchical structure of the document data in the database 100 (Step S104). Then, the process proceeds to a Step S105.

If a new document class is not to be created (NO at the Step S101), or after constructing a hierarchical structure in the Step S104, as the next step, the document-class information control unit 102 stores a document to be newly registered in the document class designated by the user (Step S105).

Next, the document-class information control unit 102 extracts information on the document class designated by the user from the class/document information management unit 104 (Step S106). Here, the information includes identification information about users authorized to refer to documents in the document class.

Further, the document-class information control unit 102 extracts rank value information on the users authorized to refer to documents in the document class from the user information management unit 103 (Step S107).

Next, on the basis of the extracted information, the document-class information control unit 102 calculates the authorization degree and the rank-value-specific authorization degrees, with respect to the document class, using the above-described formulas (1) and (2), respectively. Subsequently, the document-class information control unit 102 stores, with respect to each document class, an authorization degree and rank-value-specific authorization degrees for respective rank values in the class/document information management unit 104 (Step S108).

With that, the illegal stored document detection device 1 completes the operation of electronic document registration.

Figure 4:
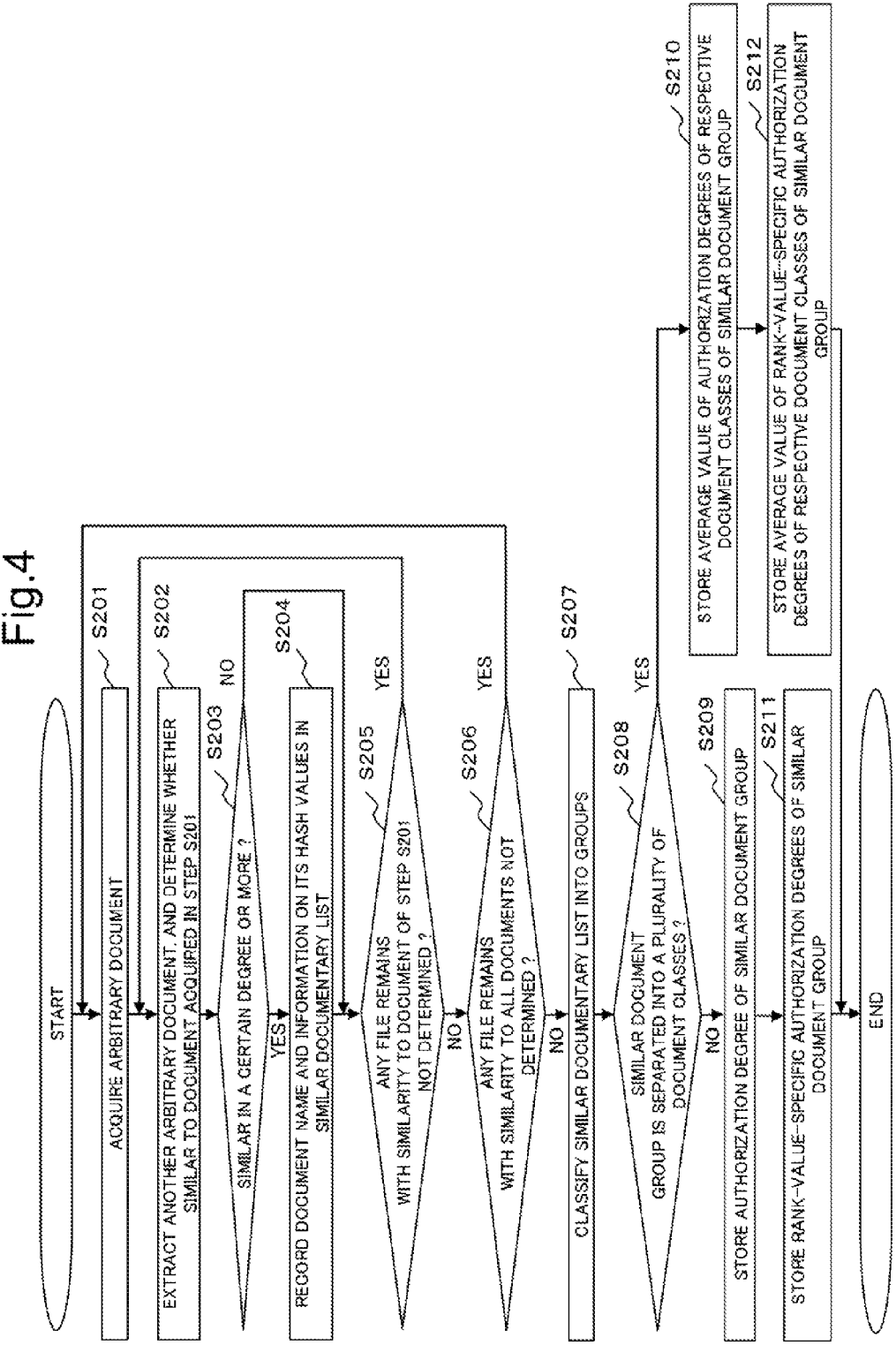
FIG. 4 is a flow chart illustrating operation of similar document analysis by the illegal stored document detection device, in the first exemplary embodiment.

FIG. 4 is a flow chart illustrating operation of similar document analysis in the illegal stored document detection device 1 in the first exemplary embodiment. Here, the process according to this flow chart may be executed under the above-described program control by the CPU 11.

As shown in FIG. 4, the document information control unit 101 firstly extracts an arbitrary document from the database 100 (Step S201).

Further, the document information control unit 101 extracts another arbitrary document. Subsequently, the document information control unit 101 identifies whether or not the another arbitrary document is similar to the document extracted in the Step S201 (Step S202).

Degree of the similarity is identified, for example, by dividing the documents extracted in the steps S201 and S202 into units of a page or a chapter, calculating a hash value for each of the units obtained by the division and determining whether or not the hash values are the same for the two documents.

A specific method of the determination is pursuant to, for example, Japanese Patent Application Laid-Open No. 1998-289246. For example, if the number of similar units for the two documents is equal to or larger than a certain value, the document information control unit 101 identifies that the two documents extracted in the steps S201 and S202, respectively, are similar to each other.

If identifying as similar (YES at the step S203), the document information control unit 101 records the document names and information on the hash values in a similar document list of the class/document information management units 104 (Step S204).

If identifying as dissimilar (NO at the step S203), the process proceeds to a Step S205.

If there remains any file which has not been identified whether to be similar or dissimilar to the document extracted in the Step S201 (YES at the Step S205), the document information control unit 101 repeats the steps from S202 to S205. If the identification of whether to be similar or dissimilar to the document extracted in the Step S201 has been completed on the whole files (NO at the step S205), the process proceeds to a Step S206.

The document information control unit 101 identifies whether there remains any other document data in the database 100 which has not been recorded in any similar document list described above (Step S206).

If there remains any document (YES at the Step S206), the document information control unit 101 extracts an arbitrary document from the remaining documents and repeats the steps from S201 to S205. If there remains no document left (NO at the step S206), the process proceeds to a Step S207.

By the steps from S201 to S206 described above, the document information control unit 101 checks similarity among all documents in the database 100 and creates a plurality of similar document lists.

Next, referring to the document-class information in the class/document information management unit 104, the document information control unit 101 classifies the similar document lists into similar document groups according to document classes in which the documents are stored (Step S207). Specifically, a method for the classification may be any method such as of combining the documents in a direct hierarchical relationship in the hierarchical structure together into one similar document group.

Next, the document information control unit 101 identifies whether a similar document group is separated into a plurality of document classes (Step S208).

If not separated (NO at the Step S208), the document information control unit 101 sets the authorization degree of the similar document group at the authorization degree of the document class in which documents of the similar document group is stored (the authorization degree calculated by the formula (1) in the Step S108 in FIG. 3) Subsequently, the document information control unit 101 stores the set authorization degree in the class/document information management unit 104 (Step S209).

Next, the document information control unit 101 sets each of the rank-value-specific authorization degrees of the similar document group at the corresponding rank-value-specific authorization degree of the document class in which documents of the similar document group are stored (the authorization degrees calculated by the formula (2) in the Step S108 in FIG. 3). Subsequently, the document information control unit 101 stores the set authorization degrees of the similar document group in the class/document information management unit 104 (Step S211). Then, the process is ended.

If a similar document group is separated into a plurality of document classes (YES at the Step S208), the document information control unit 101 sets the average of authorization degrees of respective document classes as the authorization degree of the similar document group. Subsequently, the document information control unit 101 stores the set authorization degree of the similar document group in the class/document information management unit 104 (Step S210).

Next, the document information control unit 101 sets each of the rank-value-specific authorization degrees of the similar document group at the average of rank-value-specific authorization degrees for the corresponding rank value of the respective document classes in which documents of the similar document group are stored. Subsequently, the document information control unit 101 stores the set rank-value-specific authorization degrees of the similar document group in the class/document information management unit 104 (Step S212). Then, the process is ended.

By the above-described steps from S207 to S212, the document information control unit 101 stores authorization degrees set for respective similar document groups in the class/document information management unit 104.

With that, the illegal stored document detection device 1 completes the operation of similar document analysis.

Figure 5:
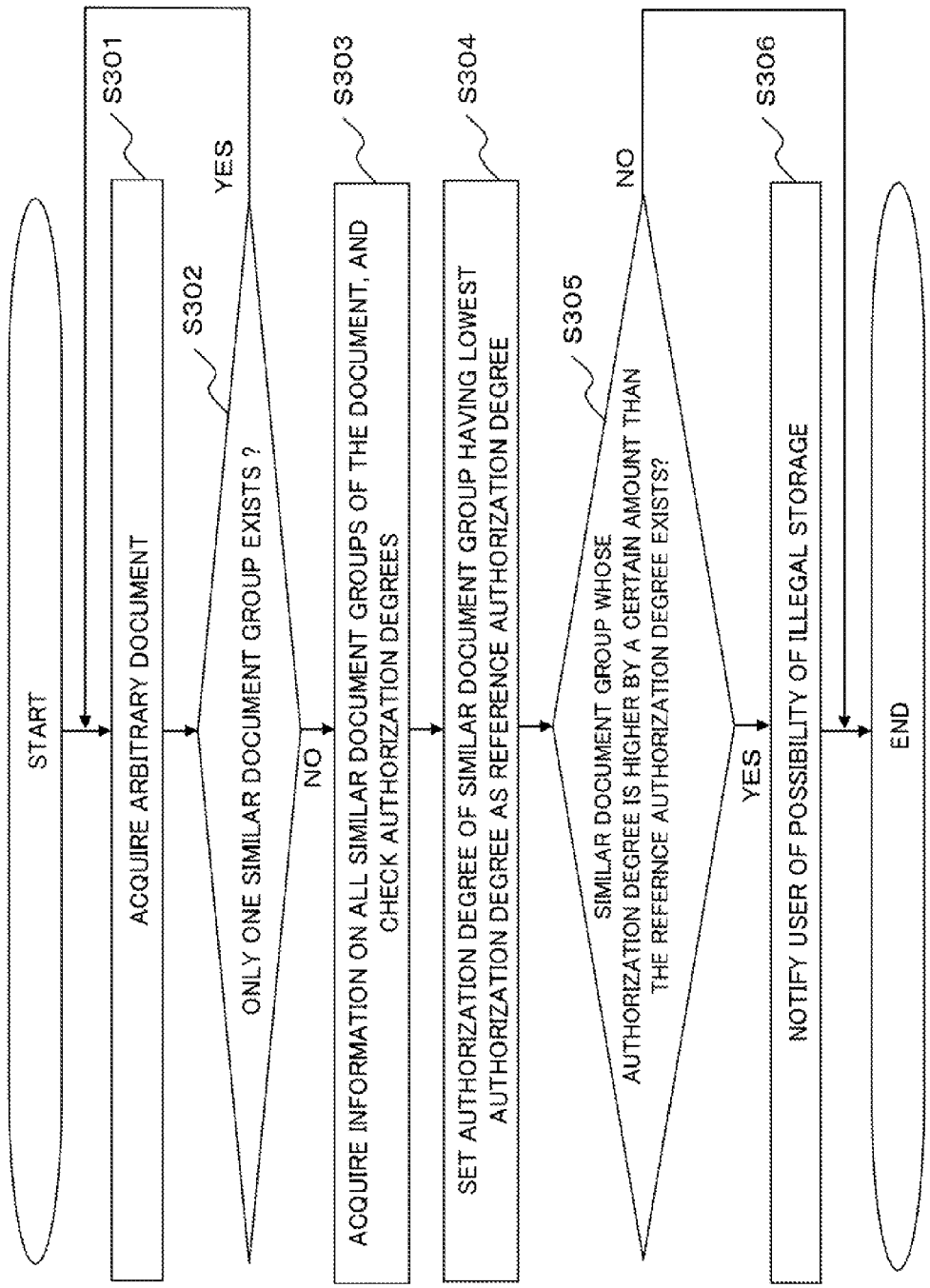
FIG. 5 is a flow chart illustrating operation of illegal authorization setting detection by the illegal stored document detection device, in the first exemplary embodiment.

FIG. 5 is a flow chart illustrating operation of illegal authorization setting detection in the illegal stored document detection device 1 in the first exemplary embodiment. The process according to this flow chart may be executed under the above-described program control by the CPU.

As shown in FIG. 5, the document-class information control unit 102 firstly extracts an arbitrary document of the database 100 (Step S301).

Next, the document-class information control unit 102 identifies whether the number of similar document groups relevant to the extracted document is one or not (Step S302).

If there exists only one such similar document group (YES at the step S302), the process returns to the Step S301. In the Step S301 then, the document-class information control unit 102 extracts another arbitrary document (Step S301).

If there exist two or more such similar documents (NO at the step S302), the document-class information control unit 102 extracts information on all similar document groups relevant to the extracted document from the class/document information management unit 104, and checks the authorization degrees of respective similar document groups to which the extracted document belongs (Step S303).

Then, the document-class information control unit 102 determines the authorization degree of a similar document group with a lowest authorization degree as a reference authorization degree (Step S304).

Next, the document-class information control unit 102 identifies whether there is any similar document group whose authorization degree is higher by a certain amount (first threshold value) than the reference authorization degree (Step S305).

If there is any similar document group whose authorization degree is higher by a certain amount than the reference authorization degree (YES at the step S305), the document-class information control unit 102 provides a notification thereof to the user (Step S306).

Here, the reason for "providing a notification to the user" is that there is a possibility of illegal storage. The illegal storage means that the authority is given to more number of users than that of authorization to be properly set, or that the authority is given to a user of a lower rank than that of authorization to be properly set, or the both. The notification may be, for example, of contents notifying a possibility of illegal storage for a "similar document group (electronic document or electronic document group) whose authorization degree is higher by a certain amount than the reference authorization degree". After that, the process is ended.

If there is no similar document group whose authorization degree is higher by a certain value than the reference authorization degree (NO at the step S305), the process is ended.

Here, by what amount by which an authorization degree is higher than the reference authorization degree a possibility of illegal storage is regarded to exist, that is, at what value the first threshold value is to be set, may be determined by the system operator or a user, and the value may be set by them to the document-class information control unit 102 via the input device 13. A method of setting the first threshold value is not limited to this, and any other methods may also be adopted. Also, as for a method of notifying a user of a possibility of illegal storage, and as for on what timing this operation is to be executed, any method and any timing may be employed.

With that, the illegal stored document detection device 1 completes operation of illegal authorization setting detection.

Next, the effect of the first exemplary embodiment will be described.

The illegal stored document detection device 1 in the present exemplary embodiment described above can detect illegal authorization setting efficiently in a short period of time.

It is because of including the following configurations. That is, firstly, the document information control unit 101 combines similar documents together into a list and classifies them into similar document groups according to the hierarchical structure. Secondly, the document-class information control unit 102 compares authorization degrees of the similar document groups with each other, and thereby detects a possibility of illegal storage. As a result, since the illegal stored document detection device 1 can perform the processing in a shorter period of time compared to the case of comparing the documents themselves with each other, it can achieve the effect of being capable of effectively detecting illegal authorization setting.

Second Exemplary Embodiment

Next, a second exemplary embodiment will be described in detail with reference to a drawing. Hereinafter, to the extent that description of the present exemplary embodiment does not become indefinite, description of contents overlapping with that in the preceding description will be omitted.

Figure 6:
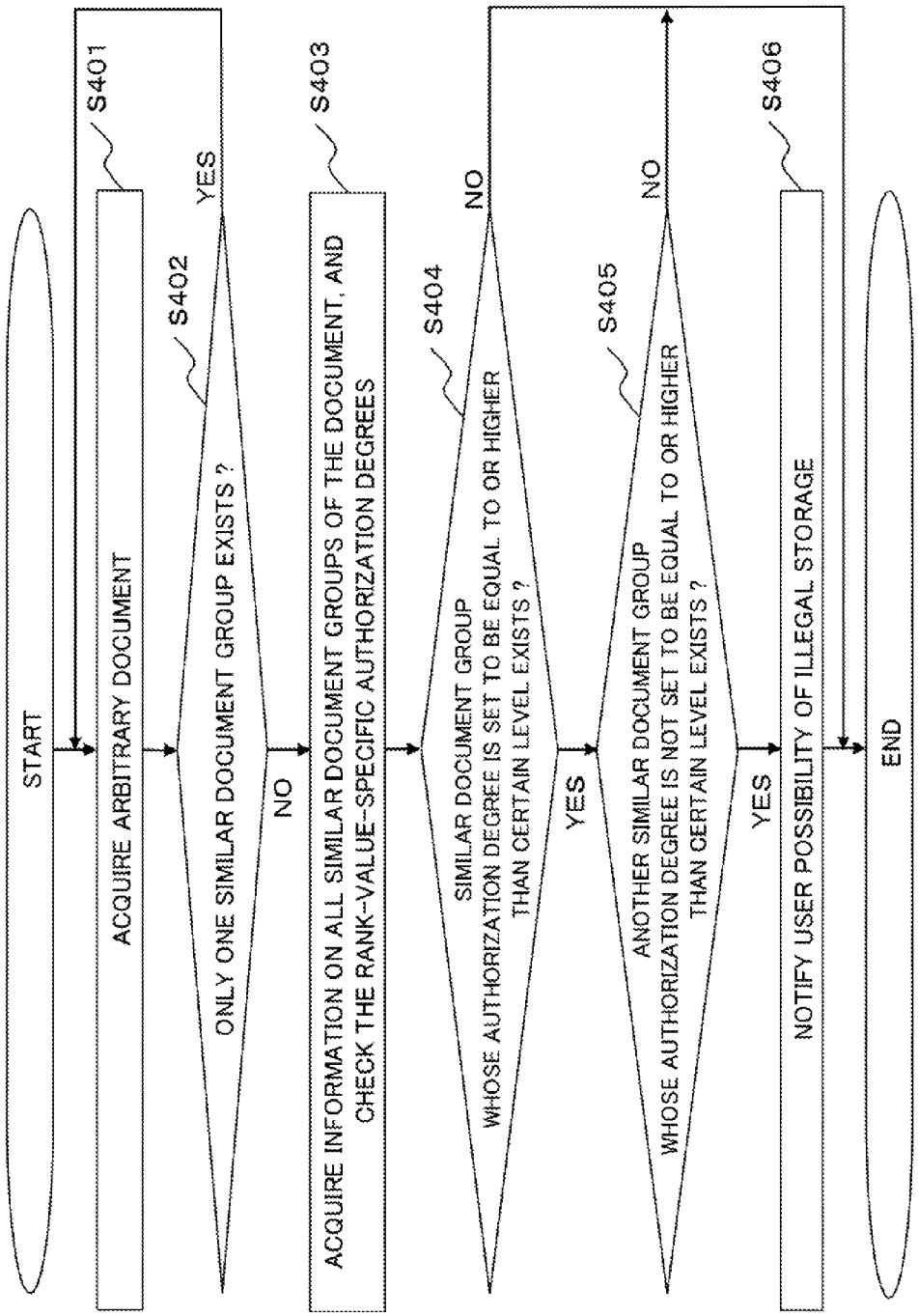
FIG. 6 is a flow chart illustrating operation of illegal authorization setting detection using authorization degrees for each rank value (referred to as "rank-value-specific authorization degrees" later) by an illegal stored document detection device, in a second exemplary embodiment.

The illegal stored document detection device 1 is also capable of illegal authorization setting detection by the use of rank-value-specific authorization degrees. Here, operations other than that of illegal authorization setting detection are assumed to be the same as in the first exemplary embodiment. Further, also possible is operation of illegal authorization setting detection which is obtained by combining the operation of illegal authorization setting detection in the first exemplary embodiment and that in the present exemplary embodiment using rank-value-specific authorization degrees FIG. 6 is a flow chart illustrating operation of illegal authorization setting detection using rank-value-specific authorization degrees in the illegal stored document detection device 1 in the second exemplary embodiment. Here, the process according to this flow chart may be executed under the above-described program control by the CPU.

As shown in FIG. 6, the document-class information control unit 102 extracts an arbitrary document of the database 100 (Step S401).

Then, the document-class information control unit 102 identifies whether the number of similar document groups relevant to the extracted document is one or not (Step S402).

If there exists only one such similar document group (YES at the Step S402), the process returns to the Step S401. In the Step S401 then, the document-class information control unit 102 extracts another arbitrary document (Step S401).

If there exist two or more such similar document groups (No at the Step S402), the document-class information control unit 102 extracts information on all similar document groups to which the extracted document belongs from the class/document information management unit 104, and checks the rank-value-specific authorization degrees (Step S403).

Then, among the similar document groups, if there exists any similar document group whose rank-value-specific authorization degrees for rank values equal to or higher than a specific one are set to be equal to or higher than a certain level, the document-class information control unit 102 extracts it (Step S404). If no such similar document group is extracted (NO at the Step S404), the process is ended.

If such a similar document group is extracted (in Step S404, YES), the document-class information control unit 102 identifies, among the similar document groups relevant to the firstly extracted document, whether there exists any other similar document group whose rank-value-specific authorization degrees for rank values equal to or higher than the above-described specific one are not set to be equal to or higher than the certain level (Step S405). If there exists no such similar document group, the process is ended (NO at the Step S405).

If there exists any such similar document group (YES at the Step S405), because the similar document group includes a possibility of illegal storage, the document-class information control unit 102 gives the user a notification of the possibility of illegal storage in the similar document group (Step S406). Then, the process is ended.

Here, in what case of the magnitudes of its rank-value-specific authorization degrees for rank values equal to or higher than a specific one a similar document group is extracted, and in terms of which rank value rank-value-specific authorization degrees for rank values equal to or higher than it are investigated may be determined by the system operator. Also, a user may determine them. A method of determining them is not limited to the above-described one, and any method can be employed. Similarly to in the first exemplary embodiment, as for a method of notifying a user of a possibility of illegal storage, and as for on what timing the present operation is to be executed, any method and any timing may be employed.

With that, the illegal stored document detection device 1 completes the operation of illegal authorization setting detection using rank-value-specific authorization degrees.

Next, the effect of the second exemplary embodiment will be described.

The illegal stored document detection device 1 in the present exemplary embodiment described above can perform illegality detection in authorization setting for each rank value.

It is because of including the following configuration. That is, the document-class information control unit 102 compares with each other the rank-value-specific authorization degrees of respective similar document groups relevant to a document extracted by the document-class information control unit 102, and investigates whether any rank-value-specific authorization degrees for rank values equal to or higher than a specific one are set to be equal to or higher than a certain level. That rank-value-specific authorization degrees for rank values equal to or higher than a specific one are high means that while large authority is given to users of rank values equal to or higher than the specific one, only small authority is given to users of lower rank values than the specific one.

Accordingly, if its rank-value-specific authorization degrees for rank values equal to or higher than a specific one are set to be equal to or higher than a certain level, it is highly possible that a document extracted by the document-class information control unit 102 is an important document. As a result, since the illegal stored document detection device 1 can detect illegal storage of a similar document group relevant to the document for which large authority is given to users of rank values equal to or higher than a specific one, it is effective in illegality detection in rank-value-specific authorization setting.

Third Exemplary Embodiment

Next, a third exemplary embodiment will be described in detail with reference to a drawing. Hereinafter, to the extent that description of the present exemplary embodiment does not become indefinite, description of contents overlapping with that in the preceding description will be omitted.

The illegal stored document detection device 1 of the present exemplary embodiment performs illegal authorization setting detection where change in the authorization degree of a similar document group between the past and the present is detected. Here, operations other than that of illegal authorization setting detection are assumed to be the same as that in the first and the second exemplary embodiments.

Also possible is operation of illegal authorization setting detection which is obtained by arbitrarily combining the operation of illegal authorization setting detection in the first exemplary embodiment, that in the second exemplary embodiment using rank-value-specific authorization degrees and that in the present exemplary embodiment, where change in the authorization degree of a similar document group between the past and the present is detected. Here, the class/document information management unit 104 stores the past and the present authorization degrees of a similar document group.

Figure 7:
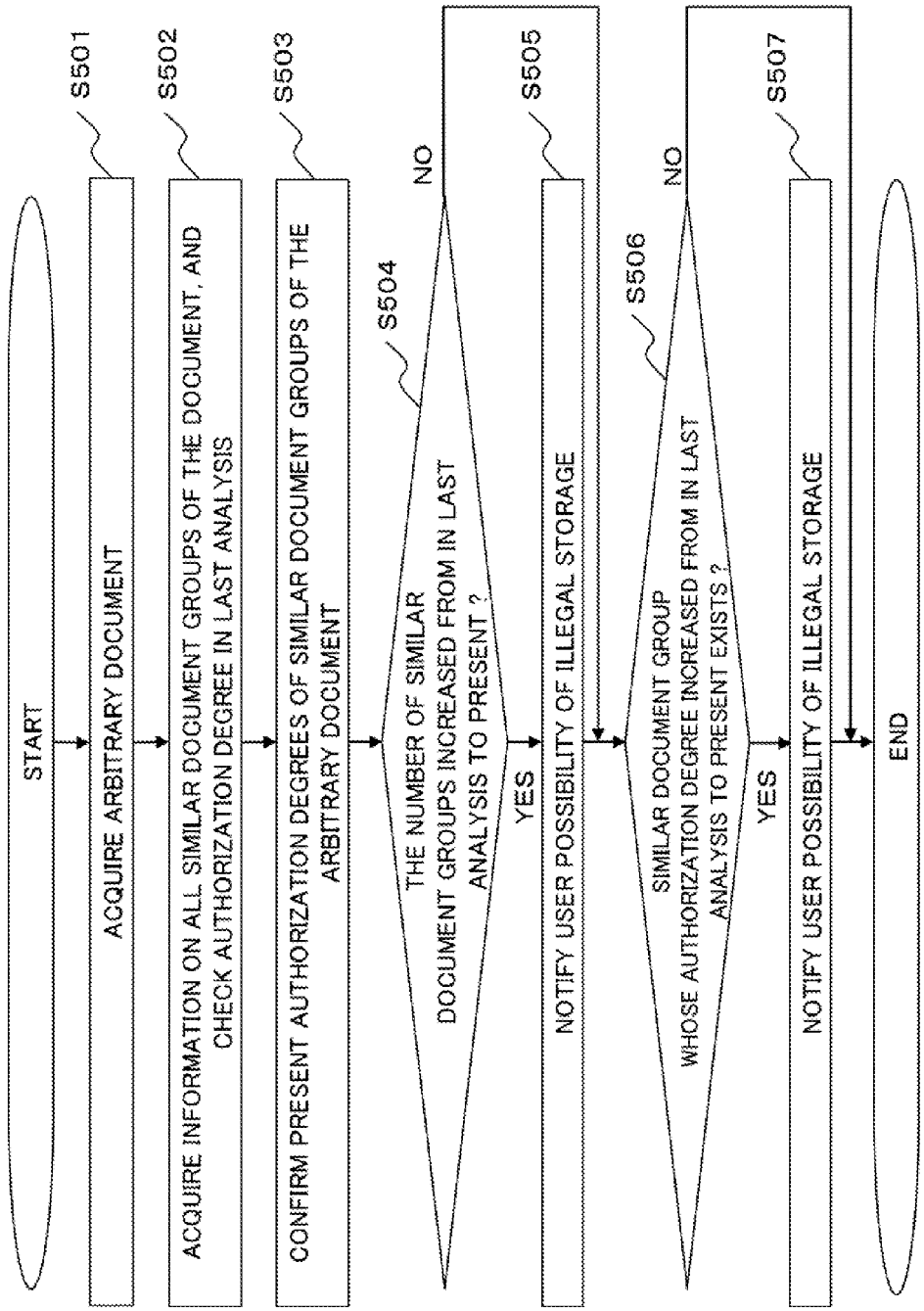
FIG. 7 is a flow chart illustrating operation of illegal authorization setting detection, which detects change in the authorization degree of a similar document group between past and present, by an illegal stored document detection device in a third exemplary embodiment.

FIG. 7 is a flow chart illustrating operation of illegal authorization setting detection by the illegal stored document detection device 1 in the third exemplary embodiment, where change in the authorization degree of a similar document group between the past and the present is detected. Here, the process according to this flow chart may be executed under the above-described program control by the CPU.

In the present exemplary embodiment, it is presupposed that the operation of similar document analysis (Steps S201-S212) in the illegal stored document detection device 1 is executed regularly.

As shown in FIG. 7, the document-class information control unit 102 firstly extracts an arbitrary document of the database 100 (Step S501).

Then, the document-class information control unit 102 extracts information on all similar document groups to which the extracted document belongs from the class/document information management unit 104, and checks their authorization degrees in the last analysis (Step S502).

Next, the document-class information control unit 102 performs the operation of similar document analysis (Steps S201-S212), and thereby confirms the present authorization degrees of similar document groups relevant to the arbitrarily extracted document (Step S503).

If the present number of similar document groups is increased from that in the last analysis (YES at the step S504), the document-class information control unit 102 identifies the present authorization setting as improper, and gives the user a notification thereof (Step S505). Here, this notification is about a possibility a similar document which should have been properly allocated to an existing similar document group has been mistakenly allocated to a different place.

If the present authorization degree of a similar document group is increased from that in the last analysis (YES at the Step S506), the document-class information control unit 102 identifies the present authorization setting as improper, and gives the user a notification thereof (Step S507). Here, this notification is about that there can be a mistake in the present authorization setting.

Similarly to in the first and the second exemplary embodiments, as for a method of notifying the user of illegal storage, and also as for on what timing the present action is to be performed, any method and any timing may be employed.

With that, the illegal stored document detection device 1 completes the operation of illegal authorization setting detection where change in the authorization degree of a similar document group between the past and the present is detected.

Next, the effect of the third exemplary embodiment will be described.

The illegal stored document detection device 1 in the present exemplary embodiment described above includes the effect that it can perform illegality detection in authorization setting even when only one similar document group is set for a document.

It is because of configuring such that the document-class information control unit 102 performs the detection by comparing the past and the present information about a similar document group.

Fourth Exemplary Embodiment

Next, a fourth exemplary embodiment will be described in detail with reference to drawings. Hereinafter, to the extent that description of the present exemplary embodiment does not become indefinite, description of contents overlapping with that in the preceding description will be omitted.

The illegal stored document detection device 1 of the present exemplary embodiment performs operation of extracting a common portion from a similar document group as a portion to protect, and executes illegal authorization setting detection by the use of the authorization degree of the portion to protect. Here, operations other than that of extracting a common portion and of illegal authorization setting detection are assumed to be the same as that in the first to the third exemplary embodiments.

Further, also possible is operation of illegal authorization setting detection which is obtained by combining that in any of the first to the third exemplary embodiments and that in the present exemplary embodiment.

Figure 8:
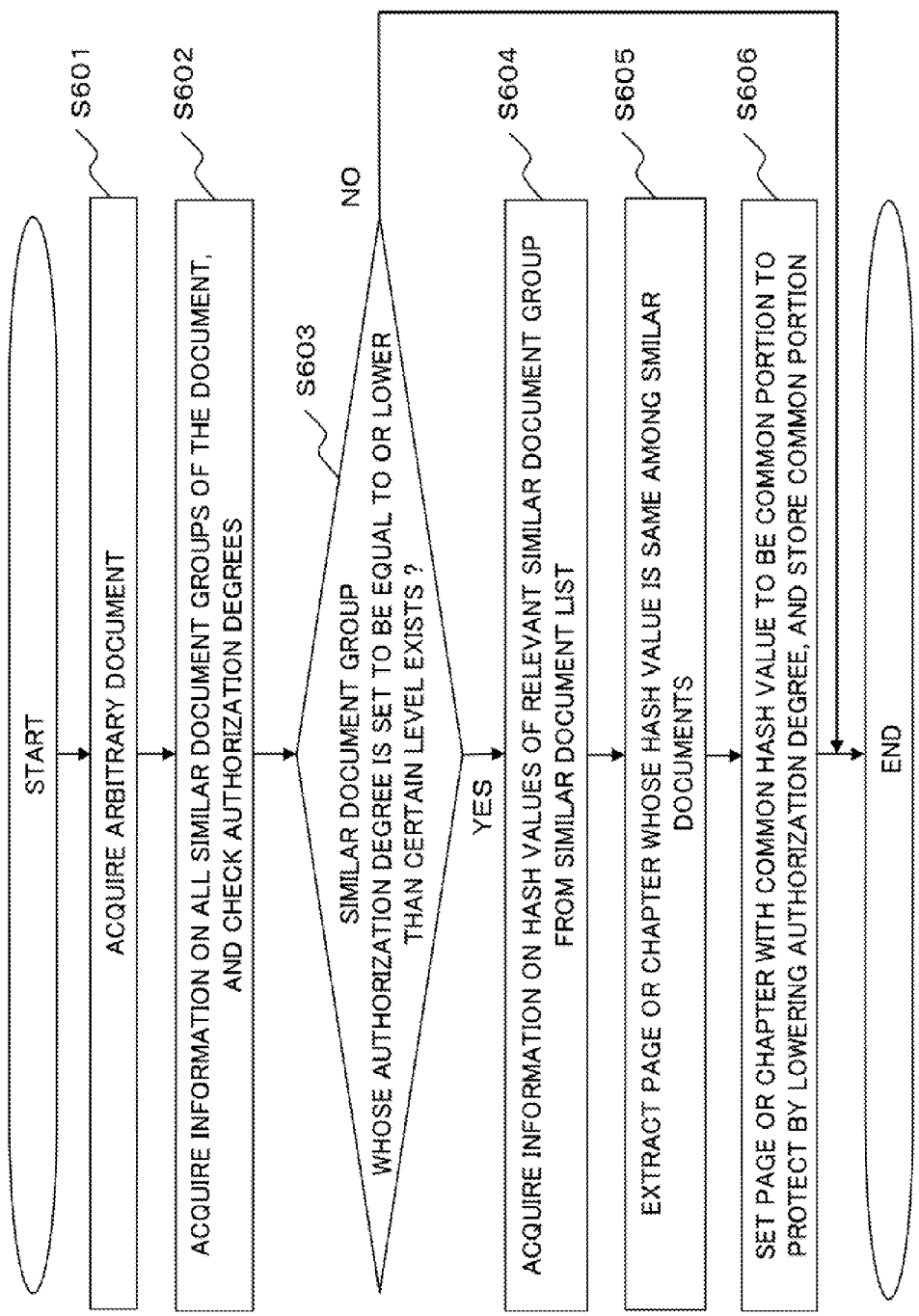
FIG. 8 is a flow chart illustrating operation of extracting a common portion from a similar document group as a portion to protect, by an illegal stored document detection device in a fourth exemplary embodiment.

FIG. 8 is a flow chart illustrating operation of extracting a common portion from a similar document group as a portion to protect, in the illegal stored document detection device 1 in the fourth exemplary embodiment. Here, the process according to this flow chart may be executed under the above-described program control by the CPU.

As shown in FIG. 8, the document information control unit 101 firstly extracts an arbitrary document of the database 100 (Step S601).

Then, the document information control unit 101 extracts information on all similar document groups to which the extracted document belongs from the class/document information management unit 104, and checks the authorization degrees of the respective similar document groups (Step S602).

Next, the document information control unit 101 determines whether there exists any similar document group whose authorization degree is set to be equal to or lower than a certain level, among the similar document groups (Step S603).

If there exists a similar document group whose authorization degree is set to be lower than a certain level (YES at the Step S603), the document information control unit 101 acquires information on the hash values of the similar document group from the corresponding similar document list of the class/document information management unit 104 (Step S604).

Next, the document information control unit 101 extracts a page or a chapter whose hash value is common among the documents (Step S605).

Next, the document information control unit 101 sets the page or chapter with a common hash value as a portion to protect by lowering its authorization degree. Subsequently, the document information control unit 101 stores the common portion in the class/document information management unit 104 (Step S606). Then, the process is ended.

If there exists no similar document group whose authorization degree is set to be equal to or lower than a certain level (NO at the Step S603), the process is ended.

Here, in what case of the smallness of its authorization degree a similar document group is extracted, and by what amount the authorization degree of a page or chapter with a common hash value is decreased may be determined by the system operator. Also, they may be determined by a user. A method of determining them is not limited to the one described above, and may be any method.

With that, the illegal stored document detection device 1 completes the operation of extracting a common potion from a similar document group as a portion to protect.

Figure 9:
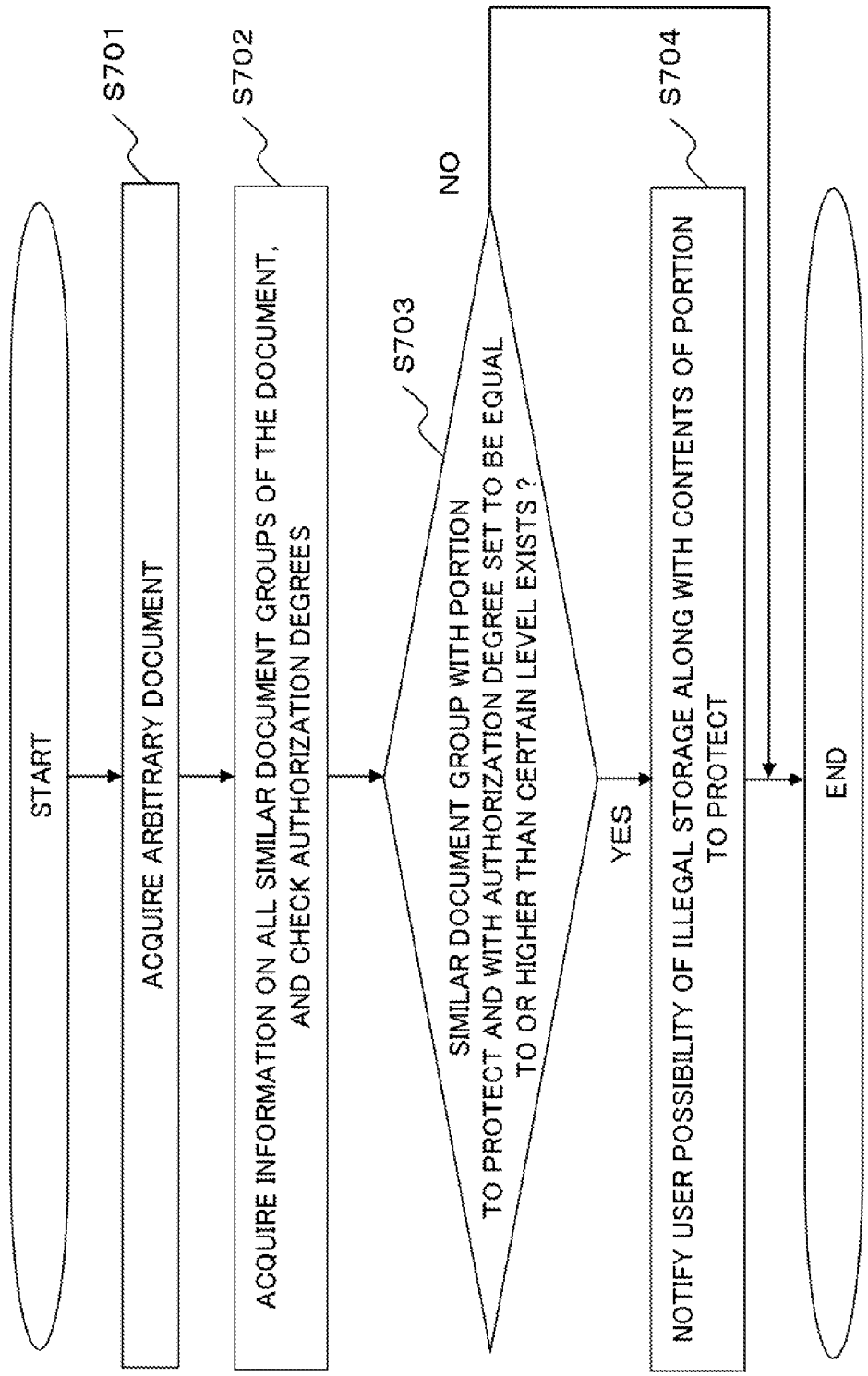
FIG. 9 is a flow chart illustrating operation of illegal authorization setting detection, using the authorization degree of a portion to protect, by the illegal stored document detection device in the fourth exemplary embodiment.

FIG. 9 is a flow chart illustrating operation of illegal authorization setting detection using the authorization degree of a portion to protect, in the illegal stored document detection device 1 in the fourth exemplary embodiment. Here, the process according to this flow chart may be executed under the above-described program control by the CPU.

As shown in FIG. 9, the document-class information control unit 102 firstly extracts an arbitrary document of the database 100 (Step S701).

Then, the document-class information control unit 102 extracts information on all similar document groups relevant to the extracted document from the class/document information management unit 104, and checks their authorization degrees (Step S702).

If there exists any similar document group which includes a portion to protect and whose authorization degree is set to be equal to or higher than a certain level (YES at the Step S703), the document-class information control unit 102 identifies the authorization setting as improper and gives the user a notification thereof along with contents of the portion to protect (Step S704). Here, this notification is about a possibility that the authorization setting was performed mistakenly.

In what case of largeness of an authorization degree a notification is to be given to the user may be determined by the system operator. Also, a user may determine that. A method of determining that is not limited to the one described above, and may be any method.

With that, the illegal stored document detection device 1 completes the operation of illegal authorization setting detection using the authorization degree of a portion to protect.

Next, the effect of the fourth exemplary embodiment will be described.

According to the illegal stored document detection device 1 in the present exemplary embodiment described above, it becomes possible to perform more precisely illegality detection in the authorization setting of a document with a possibility of having a particularly important portion.

It is because of including the following configurations. Firstly, with respect to a similar document group whose authorization degree is set to be equal to or lower than a certain level, the document information control unit 101 sets a page or a chapter to be a portion to protect by lowering its authorization degree. Secondly, if there is any similar document group which includes a portion to protect and whose authorization degree is set to be equal to or higher than a certain level, the document-class information control unit 102 identifies the authorization setting as improper and gives the user a notification thereof along with contents of the portion to protect.

It is highly possible that a document included in a similar document group of low authorization degree contains particularly important contents in it. Further, if a document with a high possibility of containing contents to protect is included in a document class of a high authorization degree, it is possible that the authority is given to more number of users than that to be given properly, owing to mistakenly performed authorization setting.

Because of these reasons, the illegal stored document detection device 1 includes the effect in illegality detection in authorization setting of a document with a possibility of having a particularly important portion.

Fifth Exemplary Embodiment

Next, a fifth exemplary embodiment will be described in detail with reference to a drawing. Hereinafter, to the extent that description of the present exemplary embodiment does not become indefinite, description of contents overlapping with that in the preceding description will be omitted.

The illegal stored document detection device 1 of the present exemplary embodiment performs announcement of guiding a newly stored document to an appropriate storage place. Here, operations other than that of announcement of guiding a newly stored document to an appropriate storage place are assumed to be the same as that in the first to the fourth exemplary embodiments. Also possible is operation which is obtained by combining the operation of illegal authorization setting detection in any of the first to the fourth exemplary embodiments and the announcement of guiding a newly stored document to an appropriate storage place in the present exemplary embodiment.

Figure 10:
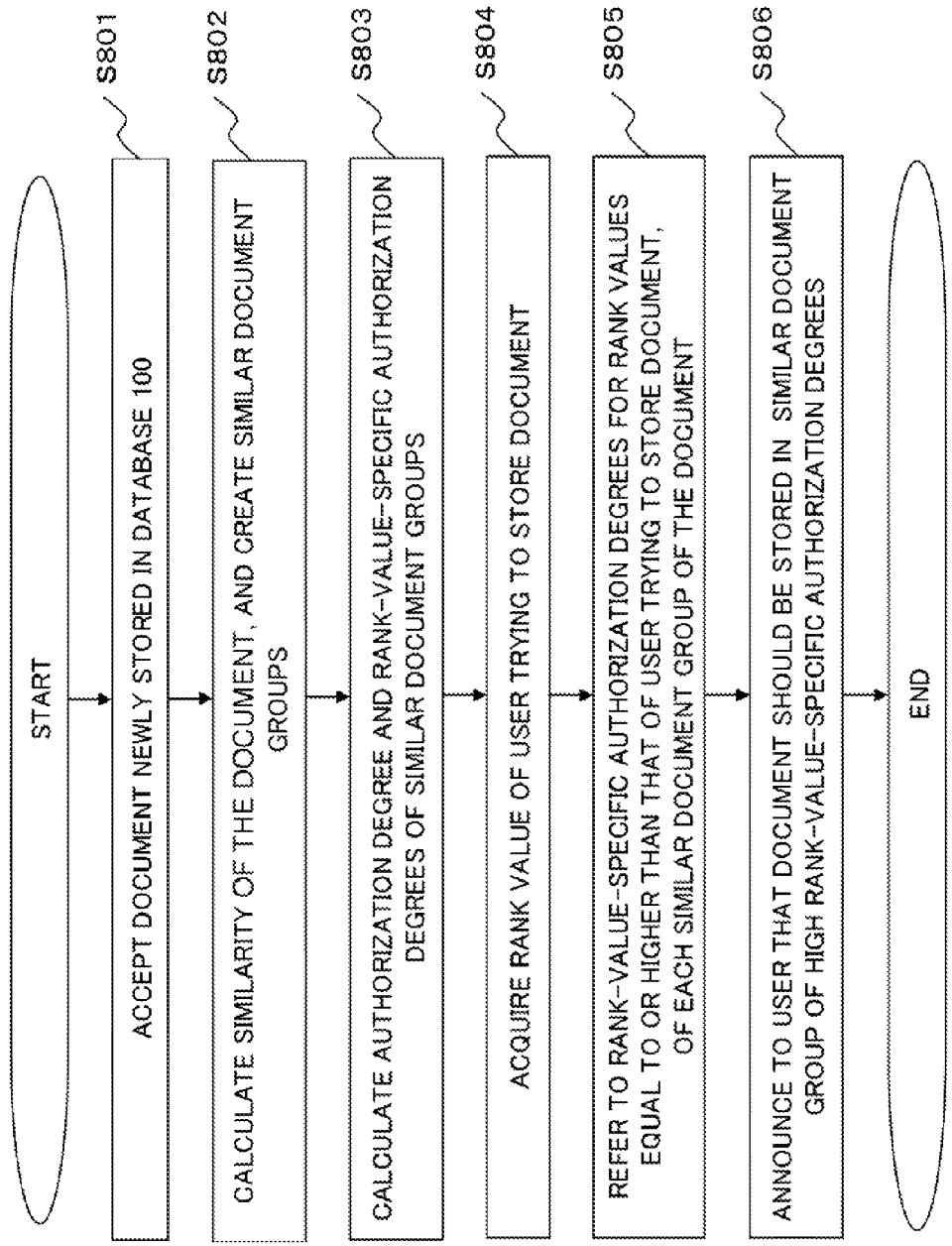
FIG. 10 is a flow chart illustrating operation of announcement of guiding a newly stored document to an appropriate storage place, by an illegal stored document detection device in a fifth exemplary embodiment.

FIG. 10 is a flow chart illustrating operation of announcement of guiding a newly stored document to an appropriate storage place in the illegal stored document detection device 1 in the fifth exemplary embodiment. Here, the process according to this flow chart may be executed under the above-described program control by the CPU.

As shown in FIG. 10, the document information control unit 101 accepts from a user a document to be newly stored in the database 100 (Step S801).

Then, the document information control unit 101 performs calculation of similarity of the document and creation of similar document groups (Step S802).

Next, the document information control unit 101 performs calculation of the authorization degree and rank-value-specific authorization degrees for each of the similar document groups (Step S803). The calculation of similarity, creation of the similar document groups and calculation of the authorization degree and rank-value-specific authorization degrees for each of the similar document groups are performed by the method of the operation of similar document analysis in the illegal stored document detection device 1 in the first exemplary embodiment (Steps from S202 to S212).

Next, the document information control unit 101 extracts the rank value of the user trying to store the document from the user information management unit 103 (Step S804).

Next, the document information control unit 101 refers to rank-value-specific authorization degrees for rank values equal to or higher than that of the user trying to store the document, of each similar document group relevant to the newly stored document (Step S805).

Then, the document information control unit 101 announces to the user that the document should be stored in a similar document group whose above-mentioned rank-value-specific authorization degrees are high (Step S806).

With that, the illegal stored document detection device 1 completes the operation of announcement of guiding a newly stored document to an appropriate storage place.

Next, the effect of the fifth exemplary embodiment will be described.

The illegal stored document detection device 1 in the present exemplary embodiment described above includes the effect that it becomes possible to make an announcement of guiding a newly stored document to an appropriate storage place so that a similar document is stored in a document class with respect to which larger authority is given to rank values equal to or higher than that of the user.

It is because the document information control unit 101 is configured to announce a similar document group whose rank-value-specific authorization degrees for rank values equal to or higher than that of the user trying to store the newly stored document are large.

Sixth Exemplary Embodiment

Next, a sixth exemplary embodiment will be described in detail with reference to a drawing. Hereinafter, to the extent that description of the present exemplary embodiment does not become indefinite, description of contents overlapping with that in the preceding description will be omitted.

Figure 11:
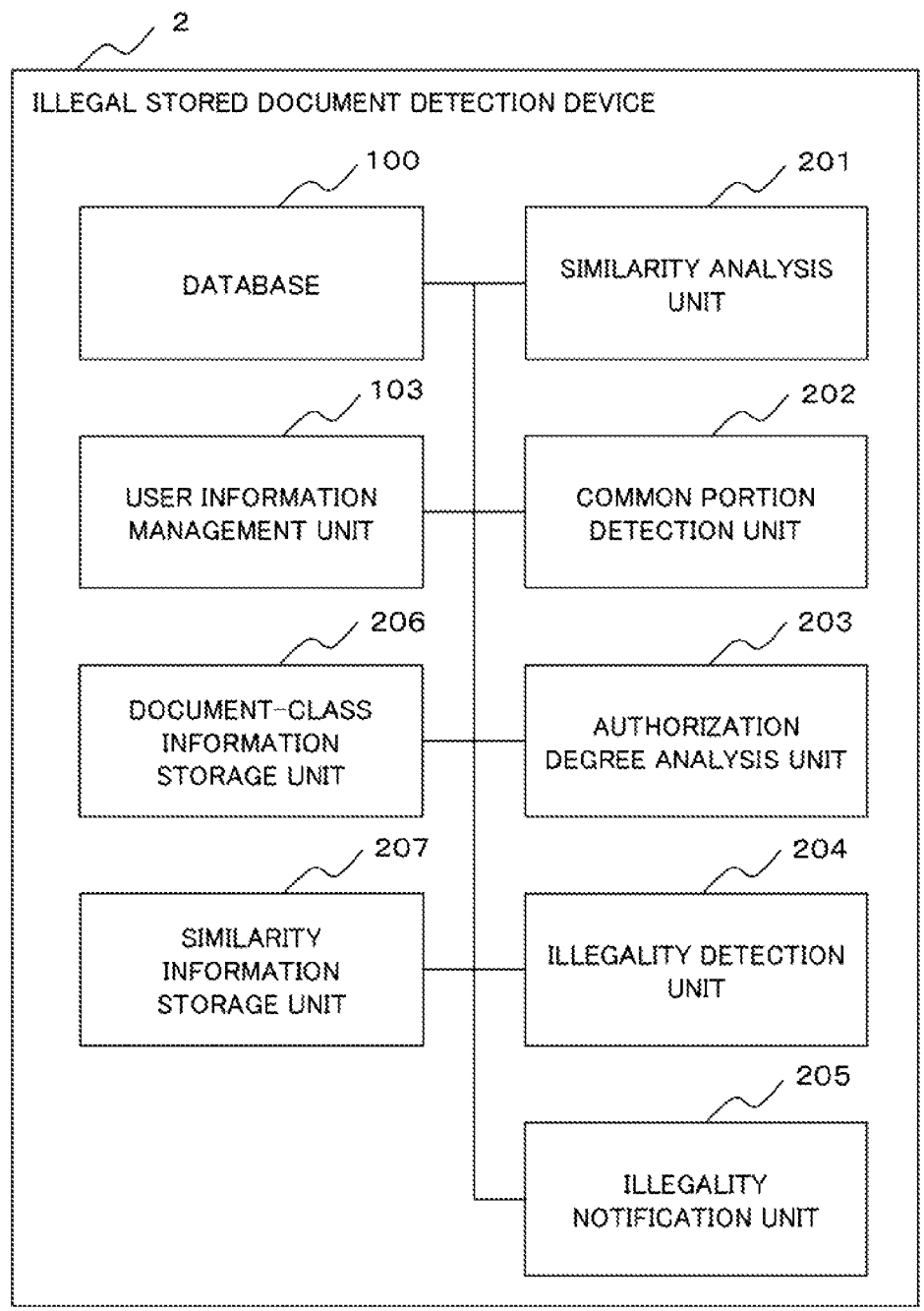
FIG. 11 is a block diagram showing a configuration of a sixth exemplary embodiment.

FIG. 11 is a block diagram showing a configuration of an illegal stored document detection device 2 according to the sixth exemplary embodiment.

Referring to FIG. 11, compared with the first exemplary embodiment, the illegal stored document detection device 2 in the present exemplary embodiment includes a similarity analysis unit 201 and a common portion detection unit 202 in place of the document information control unit 101, and does an authorization degree analysis unit 203, an illegality detection unit 204 and an illegality notification unit 205 in place of the document-class information control unit 102, and does a document-class information storage unit 206 and a similarity information storage unit 207 in place of the class/document information management unit 104.

The similarity analysis unit 201 analyzes similarity among electronic documents stored in the database 100, combines together documents having mutual similarity in equal to or higher than a certain degree into a group, and stores the information in the similarity information storage unit 207.

The common portion detection unit 202 detects a common portion of documents using data on a similar document group stored in the similarity information storage unit 207 and document data.

The authorization degree analysis unit 203 calculates the extent of authority on a similar document group according to the similarity information stored in the similarity information storage unit 207, and stores the information in the similarity information storage unit 207 by adding it there.

The illegality detection unit 204 detects a similar document group whose authorization or allocation is improper, using data on the similar document groups stored in the similarity information storage unit 207.

The illegality notification unit 205 notifies the user of information on the improper authorization or allocation detected by the illegality detection unit 204.

The document-class information storage unit 206 stores a hierarchical structure and authorization of each document class.

The similarity information storage unit 207 stores information on similarity of documents.

Operation of the illegal stored document detection device 2 is the same as that in the first to the fifth exemplary embodiments.

Each component in each exemplary embodiment described above can be realized obviously by hardware, and can also be realized by a computer and firmware based on program control. A program is supplied being recorded in a computer-readable recording medium such as a magnetic disk and a semiconductor memory, and is retrieved by a computer at a time such as of starting up of the computer. The retrieved program controls operation of the computer, and thereby causes the computer to function as components in each of the exemplary embodiments described above.

Although the present invention has been described above with reference to each exemplary embodiment, it is not limited to the above-described exemplary embodiments. In the configurations and details, various changes which are understood by those skilled in the art can be made within the scope of the present invention.

For example, each component described in each of the above exemplary embodiments does not necessarily need to be an individually separated existence. For example, the components may be configured such that a plurality of components is realized as one module or one component is realized by a plurality of modules. Also, they may be configured such that a certain component is a part of another component, or a part of a certain component overlaps with a part of another component.

Further, although, in each of the exemplary embodiments described above, a plurality of operations are described sequentially in the form of a flow chart, an order of executing the plurality of operations is not limited to the order described there. Therefore, when implementing each of the exemplary embodiments, the order of the plurality of operations may be changed to the extent that the change causes no trouble in the contents.

Still further, in each of the exemplary embodiments described above, the pluralities of operations do not necessarily need to be executed at individually different timings. For example, it is possible that an operation starts during execution of another operation, or that the timing of executing an operation and that of another operation overlap with each other partly or wholly.

Yet further, although, in each of the exemplary embodiments described above, it has been described that an operation triggers another operation, the description does not limit whole relationship between an operation and another operation. Therefore, when implementing each of the exemplary embodiments, the relationship between the pluralities of operations can be changed to the extent that the change causes no trouble in the contents. Furthermore, the specific description of each operation of each component is not one limiting the operation. Therefore, each specific operation of each component may be changed to the extent that the change causes no trouble in characteristics in function, performance and the like, in implementing each of the exemplary embodiments.

Part or the whole of the above-described exemplary embodiments can also be described as following further exemplary embodiments, but it is not limited to the following ones.

Further Exemplary Embodiment 1

An information processing device, comprising:
a database which includes a hierarchical structure and stores electronic documents;
a user information management unit which stores rank values of users of said database;
a class/document information management unit which stores authorization degrees of electronic documents or of electronic document groups, and authorization degree of respective document classes in said database where the electronic documents or document groups are stored;
a document information control unit which analyzes the electronic documents stored in said database and combines together said electronic documents having mutual similarity in a degree equal to or higher than a certain level into a similar document group; and
a document-class information control unit which analyzes the authorization degree of each document class in said database with reference to said rank values of database users, and thus detects an electronic document or an electronic document group whose authorization setting is improper.

Further Exemplary Embodiment 2

The information processing device described in further exemplary embodiment 1, wherein
said document-class information control unit calculates rank-value-specific authorization degrees of said similar document group with reference to said rank values of database users and authorization degrees of respective document classes and,
by comparing the rank-value-specific authorization degrees among said similar document groups, investigates whether or not rank-value-specific authorization degrees for rank values equal to or higher than a specific one are set to be equal to or higher than a certain level, and thereby detects an electronic document or an electronic document group whose authorization setting is improper Further Exemplary Embodiment 3

The information processing device described in further exemplary embodiments 1 or 2, wherein
said document-class information control unit compares the authorization degree of an arbitrary similar document group in the last analysis with that at present and, if the number of similar document groups is increased or the authorization degree is increased, determines the authorization setting as improper and notifies a user of it.

Further Exemplary Embodiment 4

The information processing device described in any one of further exemplary embodiments 1 to 3, wherein,
if there exists an arbitrary similar document group whose authorization degree is lower than a certain level, said document information control unit extracts a common portion which is similar among the electronic documents included in the similar document group, and set it as a portion to protect by lowering the authorization degree, and, if there exists a portion to protect and there also exists a similar document group whose authorization degree is set to be equal to or higher than a certain level, said document-class information control unit determines the authorization setting as improper and notifies a user of it.

Further Exemplary Embodiment 5

The information processing device described in any one of further exemplary embodiments 1 to 4, wherein
said document information control unit accepts a newly stored document to be stored in said database, performs calculation of its similarity, creation of its similar document groups and calculation of an authorization degree and rank-value-specific authorization degrees for each of the similar document groups, refers to rank-value-specific authorization degrees for rank values equal to or higher than that for a user trying to store the newly stored document, and gives the user an announcement that the document should be stored in a similar document group which is high in such kind of rank-value-specific authorization degrees.

Further Exemplary Embodiment 6

An illegal stored document detection method, wherein, in a computer:
a document information control unit analyzes electronic documents stored in a database having a hierarchical structure,
records the electronic documents having mutual similarity in a degree equal to or higher than a certain level into a similar document list, classifies the similar document list into similar document groups according to said hierarchical structure of the database, analyzes an authorization degree of each document class in said database by referring to rank values of database users stored in a user information management unit, and stores the result in a class/document information management unit, refers to, at the class/document information management unit, authorization degrees of respective document classes in which similar document groups are stored, and detects an electronic document or an electronic document group whose authorization setting is improper.

Further Exemplary Embodiment 7

The illegal stored document detection method described in further exemplary embodiment 6, wherein said illegal stored document detection device calculates rank-value-specific authorization degrees of said similar document group with reference to said rank values of database users and authorization degrees of respective document classes and, by comparing the rank-value-specific authorization degrees among said similar document groups, investigates whether or not rank-value-specific authorization degrees for rank values equal to or higher than a specific one are set to be equal to or higher than a certain level, and thereby detects an electronic document or an electronic document group whose authorization setting is improper Further Exemplary Embodiment 8

The illegal stored document detection method described in further exemplary embodiments 6 or 7, wherein said computer compares the authorization degree of an arbitrary similar document group in the last analysis with that at present and, if the number of similar document groups is increased or the authorization degree is increased, determines the authorization setting as improper and notifies a user of it.

Further Exemplary Embodiment 9

The illegal stored document prevention method described in any one of further exemplary embodiments 6 to 8, wherein said computer accepts a newly stored document to be stored in said database, performs calculation of its similarity, creation of its similar document groups and calculation of an authorization degree and rank-value-specific authorization degrees for each of the similar document groups, refers to rank-value-specific authorization degrees for rank values equal to or higher than that for a user trying to store the newly stored document, and gives the user an announcement that the document should be stored in a similar document group which is high in such kind of rank-value-specific authorization degrees.

Further Exemplary Embodiment 10

A non-volatile recording medium storing a program for causing a computer to execute the processing which includes analyzing electronic documents stored in a database having a hierarchical structure, recording documents having mutual similarity equal to or higher than a certain level into a similar document list, classifying the similar document list into similar document groups according to said hierarchical structure of the database, analyzing an authorization degree of each document class in said database by referring to rank values of database users stored in a user information management unit, and storing the result in a class/document information management unit referring to, at the class/document information management unit, authorization degrees of respective document classses in which similar document groups are stored, and detecting an electronic document or an electronic document group whose authorization setting is improper, and outputting a message of urging a user to check it.

Further Exemplary Embodiment 11

The illegal stored document detection method described in any one of further exemplary embodiments 6 to 9, wherein, if there exists an arbitrary similar document group whose authorization degree is equal to or lower than a certain level, said computer extracts a common portion which is similar among the electronic documents included in the similar document group, and set it as a portion to protect by lowering the authorization degree, and, if there exists a portion to protect and there also exists a similar document group whose authorization degree is set to be equal to or higher than a certain level, said computer determines the authorization setting as improper and notifies a user of it.

Further Exemplary Embodiment 12

The non-volatile recording medium described in further exemplary embodiment 10 storing a program for causing a computer to execute a process of calculating rank-value-specific authorization degrees of each of said similar document group with reference to said rank values of database users and authorization degrees of respective document classes and, by comparing the rank-value-specific authorization degrees among said similar document groups, investigating whether or not rank-value-specific authorization degrees for rank values higher than a specific one are set to be equal to or higher than a certain level, and thereby detecting an electronic document or an electronic document group whose authorization setting is improper, and outputting a message of urging a user to check it.

Further Exemplary Embodiment 13

The non-volatile recording medium described in further exemplary embodiments 10 or 12 storing a program for causing a computer to execute a process of comparing the authorization degree of an arbitrary similar document group in the last analysis with that at present and, if the number of similar document groups is increased or the authorization degree is increased, determining the authorization setting as improper and notifying a user of it.

Further Exemplary Embodiment 14

The non-volatile recording medium described in any one of further exemplary embodiments 10, 12 and 13 storing a program for causing a computer to execute a process of, if there exists an arbitrary similar document group whose authorization degree is equal to or lower than a certain level, extracting a common portion which is similar among the electronic documents included in the similar document group, and setting it as a portion to protect by lowering the authorization degree, and, if there exists a portion to protect and there also exists a similar document group whose authorization degree is set to be equal to or higher than a certain level, determining the authorization setting as improper and notifying a user of it.

Further Exemplary Embodiment 15

The non-volatile recording medium described in any one of further exemplary embodiments 10 and from 12 to 14 storing a program for causing a computer to execute a process of accepting a newly stored document to be stored in said database, performing calculation of its similarity, creation of its similar document groups and calculation of an authorization degree and rank-value-specific authorization degrees of each of the similar document groups, referring to rank-value-specific authorization degrees for rank values equal to or higher than that for a user trying to store the newly stored document, and giving the user an announcement that the document should be stored in a similar document group which is high in such kind of rank-value-specific authorization degrees.

Further Exemplary Embodiment 16

An information processing device, comprising:

a database which includes a hierarchical structure and stores electronic documents;

a document-class information storage unit which stores a hierarchical structure and authorization degrees of respective document classes;

a similarity information storage unit which stores similarity information about electronic documents;

a user information management unit which stores rank values of users of said database;

a similarity analysis unit which analyzes electronic documents stored in said database, creates a similar document list listing the electronic documents having mutual similarity in a degree equal to or higher than a certain level and, using document class information stored in said document-class information storage unit, classifies the electronic documents into similar document groups on the basis of the similar document list, and stores the resulting information in said similarity information storage unit;

a common portion detection unit which, using data on the similar document groups stored in said similarity information storage unit and document data, detects a common portion among the electronic documents;

an authorization degree analysis unit which calculates an authorization degree with respect to the similar document groups according to the similarity information stored in said similarity information storage unit, using information on ranks of users stored in said user information management unit, and adds the information to said similarity information storage unit;

an illegality detection unit which detects a similar document group whose authorization setting or allocation is improper, using data on the similar document groups stored in said similarity information storage unit; and an illegality notification unit which notifies a user of information on improper authorization or allocation detected by said illegality detection unit.

The confidential document search system described in Patent Document 1 mentioned above checks importance, with respect to each document file, according to whether a characteristic language is included or not. Accordingly, because the confidential document search system needs to check all files, the technology described in Patent Document 1 has a problem in that the calculation amount is likely to be enormous. Further, the confidential document search system determines only importance of a document. Accordingly, the technology described in Patent Document 1 has another problem in that the confidential document search system can perform only authorization setting where the authority is equally given to all users.

An example of the effect of the present invention is that it makes it possible to reduce the calculation amount for illegality detection and to set accessing authority depending on a user.

While the present invention has been described with reference to the exemplary embodiments above, the present invention is not limited to the above-mentioned embodiments. Various changes in form and details of the present invention which can be understood by those skilled in the art may be made therein without departing from the spirit and scope of the present invention.

REFERENCE SIGNS LIST 1, 2 illegal stored document detection device
11 CPU
12 output device
13 input device
14 primary storage device
15 secondary storage device
17 recording medium
100 database
101 document information control unit
102 document-class information control unit
103 user information management unit
104 class/document information management unit
201 similarity analysis unit
202 common portion detection unit
203 authorization degree analysis unit
204 illegality detection unit
205 illegality notification unit
206 document-class information storage unit
207 similarity information storage unit

The invention claimed is:

1. An information processing device, comprising:
a database which includes a hierarchical structure and stores electronic documents;
a user information management unit which stores rank values of users of said database, wherein each rank value of the rank values corresponds to height of an authority level for a user;
a class/document information management unit which stores authorization degrees of electronic documents or of electronic document groups, and authorization degrees of respective document classes in said database where the electronic documents or document groups are stored;
a document information control unit which analyzes the electronic documents stored in said database and combines together said electronic documents having mutual similarity in a degree equal to or higher than a certain level into a similar document group; and
a document-class information control unit which calculates authorization degrees of respective document classes in said database in terms of each said similar document group with reference to said rank values of database users, analyzes said authorization degrees, thus detects an electronic document or an electronic document group whose authorization setting is improper based on results of the analyzing said authorization degrees, compares the authorization degree of an arbitrary similar document group in the last analysis with that at present and, if the authorization degree is increased, determines the authorization setting as improper and notifies a user of it.

2. The information processing device according to claim 1, wherein
said document-class information control unit
calculates rank-value-specific authorization degrees of said similar document group with reference to said rank values of database users and authorization degrees of respective document classes and,
by comparing the rank-value-specific authorization degrees among said similar document groups, investigates whether or not rank-value-specific authorization degrees for rank values equal to or higher than a specific one are set to be equal to or higher than a certain level, and thereby detects an electronic document or an electronic document group whose authorization setting is improper.

3. The information processing device according to claim 1, wherein
said document-class information control unit compares the authorization degree of an arbitrary similar document group in the last analysis with that at present and, if the number of similar document groups is increased, determines the authorization setting as improper and notifies a user of it.

4. The information processing device according to claim 1, wherein if there exists an arbitrary similar document group whose authorization degree is lower than a certain level, said document information control unit extracts a common portion which is similar among the electronic documents included in the similar document group, and set it as a portion to protect by lowering the authorization degree, and,
if there exists a portion to protect and there also exists a similar document group whose authorization degree is set to be equal to or higher than a certain level, said document-class information control unit determines the authorization setting as improper and notifies a user of it.

5. The information processing device according to claim 1, wherein
said document information control unit accepts a newly stored document to be stored in said database, performs calculation of its similarity, creation of its similar document groups and calculation of an authorization degree and rank-value-specific authorization degrees for each of the similar document groups, and
refers to rank-value-specific authorization degrees for rank values equal to or higher than that for a user trying to store the newly stored document, and gives the user an announcement that the document should be stored in a similar document group which is high in such kind of rank-value-specific authorization degrees.

6. An illegal stored document detection method, wherein,
a computer analyzes electronic documents stored in a database having a hierarchical structure,
records the electronic documents having mutual similarity in a degree equal to or higher than a certain level into a similar document list,
classifies the similar document list into similar document groups according to said hierarchical structure of the database,
calculates an authorization degree of each document class in said database in terms of each said similar document group by referring to rank values of database users stored in a user information management unit, and stores the result in a class/document information management unit, wherein each rank value of the rank values corresponds to a-height of an authority level for a user,
refers to, at the class/document information management unit, authorization degrees of respective document classes in which similar document groups are stored, and
analyzes said authorization degrees, detects an electronic document or an electronic document group whose authorization setting is improper based on results of the analyzing said authorization degrees,
compares the authorization degree of an arbitrary similar document group in the last analysis with that at present and,
if the authorization degree is increased, determines the authorization setting as improper and notifies a user of it.

7. The illegal stored document detection method according to claim 6, wherein said computer calculates rank-value-specific authorization degrees of said similar document group with reference to said rank values of database users and authorization degrees of respective document classes and,
by comparing the rank-value-specific authorization degrees among said similar document groups, investigates whether or not rank-value-specific authorization degrees for rank values equal to or higher than a specific one are set to be equal to or higher than a certain level, and thereby detects an electronic document or an electronic document group whose authorization setting is improper.

8. The illegal stored document detection method according to claim 6, wherein
said computer
compares the authorization degree of an arbitrary similar document group in the last analysis with that at present and, if the number of similar document groups is increased or the authorization degree is increased, determines the authorization setting as improper and notifies a user of it.

9. The illegal stored document detection method according to claim 6, wherein
said computer
accepts a newly stored document to be stored in said database, performs calculation of its similarity, creation of its similar document groups and calculation of an authorization degree and rank-value-specific authorization degrees for each of the similar document groups, refers to rank-value-specific authorization degrees for rank values equal to or higher than that for a user trying to store the newly stored document, and gives the user an announcement that the document should be stored in a similar document group which is high in such kind of rank-value-specific authorization degrees.

10. A non-volatile recording medium storing a program for causing a computer to execute the processing which comprises:
analyzing electronic documents stored in a database having a hierarchical structure,
recording the electronic documents having mutual similarity in a degree equal to or higher than a certain level into a similar document list,
classifying the similar document list into similar document groups according to said hierarchical structure of the database,
calculating an authorization degree of each document class in said database in terms of each said similar document group by referring to rank values of database users stored in a user information management unit, and storing the result in a class/document information management unit, wherein each rank value of the rank values corresponds to height of an authority level for a user; and referring to, at the class/document information management unit, authorization degrees of respective document classes in which similar document groups are stored, and analyzing said authorization degrees, detecting an electronic document or an electronic document group whose authorization setting is improper based on results of the analyzing said authorization degrees, comparing the authorization degree of an arbitrary similar document group in the last analysis with that at present and, if the authorization degree is increased, determining the authorization setting as improper and notifying a user of it.

* * * * *